United States Patent
Sentimenti et al.

(10) Patent No.: US 7,255,795 B2
(45) Date of Patent: Aug. 14, 2007

(54) PROCESS FOR SELECTIVELY REMOVING MOLYBDENUM FROM LIQUID MIXTURES CONTAINING IT TOGETHER WITH VANADIUM

(75) Inventors: Emilio Sentimenti, Villorba-Treviso (IT); Nicoletta Panariti, Lecco (IT)

(73) Assignees: ENI S.p.A., Rome (IT); Snamprogetti S.p.A., San Donato Milanese (IT); Enitecnologie S.p.A., San Donato Milanese (IT)

( * ) Notice: Subject to any disclaimer, the term of this patent is extended or adjusted under 35 U.S.C. 154(b) by 220 days.

(21) Appl. No.: 10/478,501

(22) PCT Filed: May 14, 2002

(86) PCT No.: PCT/EP02/05313

§ 371 (c)(1),
(2), (4) Date: Aug. 26, 2004

(87) PCT Pub. No.: WO02/097144

PCT Pub. Date: Dec. 5, 2002

(65) Prior Publication Data

US 2004/0262232 A1    Dec. 30, 2004

(30) Foreign Application Priority Data

May 25, 2001    (IT)    ................. MI01A1111

(51) Int. Cl.
*C02F 1/62* (2006.01)
*C02F 101/20* (2006.01)

(52) U.S. Cl. ............ 210/725; 210/727; 210/729; 210/912; 423/55

(58) Field of Classification Search ............ 210/725
See application file for complete search history.

(56) References Cited

U.S. PATENT DOCUMENTS

| 3,607,008 | A |   | 9/1971 | Kim et al. ............ 423/54 |
| 3,912,623 | A | * | 10/1975 | Buza et al. ............ 209/167 |
| 4,051,316 | A | * | 9/1977 | Wing et al. ............ 536/107 |
| 4,444,733 | A |   | 4/1984 | Laferty et al. ............ 423/24 |
| 4,605,518 | A | * | 8/1986 | Crozier ............ 558/244 |
| 5,320,759 | A | * | 6/1994 | Coltrinari ............ 210/705 |
| 5,505,857 | A | * | 4/1996 | Misra et al. ............ 210/709 |
| 5,660,735 | A | * | 8/1997 | Coltrinari et al. ............ 210/723 |

FOREIGN PATENT DOCUMENTS

| DE | 258 573 | 7/1988 |
| SU | 273 932 | 9/1977 |

OTHER PUBLICATIONS

Database WPI Section Ch, Week 197812 Derwent Publications Ltd., London, GB; Class M25, AN 1978-23073A XP002223610 & SU 273 932 A (Moscow Steel Alloys Inst), Sep. 20, 1977 abstract.

* cited by examiner

*Primary Examiner*—Peter A. Hruskoci
(74) *Attorney, Agent, or Firm*—Oblon, Spivak, McClelland, Maier & Neustadt, P.C.

(57) ABSTRACT

Process for selectively removing molybdenum from liquid mixtures containing it, in a quantity greater than (200) mg/l, together with vanadium characterized in that it comprises the following steps: bringing the liquid mixture to a pH of less than (3); adding a solution of an alkaline xanthate to the solution so that the molar ratio molybdenum/alkaline xanthate ranges from ($1/4$) to ($1/8$), maintaining the pH constant by means of the addition of an inorganic acid; stirring the mixture causing the precipitation of the molybdenum present in the mixture.

10 Claims, No Drawings

PROCESS FOR SELECTIVELY REMOVING MOLYBDENUM FROM LIQUID MIXTURES CONTAINING IT TOGETHER WITH VANADIUM

The present invention relates to a process for selectively removing molybdenum from liquid mixtures containing it, together with vanadium.

The separation between molybdenum and vanadium from inorganic solutions containing them is generally not very easy. Among the most widely-known and applicable technologies currently used, the precipitation of molybdenum sulfide with alkaline sulfides or sulfuric acid, which leaves the vanadium in solution, or extraction and separation with organic solvents, can be mentioned.

In the former case, the process is relatively simple, leading to the formation of an inorganic compound insoluble in organic solvents and which cannot therefore be directly re-used in certain applications, in the latter case, the process is definitely more complex with the formation of an organic solution containing molybdenum.

We have found that by using alkaline xanthates in certain concentrations, it is possible to obtain good separation yields using a simple process which leads to the formation of molybdenum compounds having a solubility in organic solvents which allows them to be directly re-used in certain applications.

Xanthates of alkaline metals have been known for some time and are mostly applied, apart from the importance of cellulose xanthate for the production of rayon, as flotation collectors of metallic sulfides, in particular copper and molybdenum sulfides.

They are also used in the vulcanization of rubber, as herbicides and pesticides, additives for lubricants, etc.

Free acids are of the $ROCS_2H$ type, colourless, unstable and soluble in common organic solvents; they decompose at room temperature into carbon disulfide and into the corresponding alcohol according to the following scheme:

The corresponding alkaline salts, on the other hand, are relatively stable solids, soluble in water, alcohol and polar organic solvents. In aqueous solution and at room temperature, potassium ethyl xanthate, for example, hydrolyzes as follows:

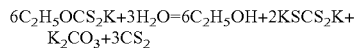

by further hydrolysis of the carbon disulfide and trithiocarbonate, hydrogen sulfide is formed.

The salts of heavy metals are more soluble in organic solvents, chloroform, THF and benzene whereas they are not very soluble in water, alcohol and aliphatic hydrocarbons. A sufficient number of C atoms makes them more soluble in organic solvents.

The process, object of the present invention, for selectively removing molybdenum from liquid mixtures containing it, in a quantity greater than 200 mg/l, together with vanadium, is characterized in that it comprises the following steps:

bringing the liquid mixture to a pH of less than 3, preferably equal to or less than 2;

adding a solution of an alkaline xanthate to the solution so that the molar ratio molybdenum/alkaline xanthate ranges from ¼ to ⅛, preferably from ⅕ to ⅐, maintaining the pH constant by means of the addition of an inorganic acid;

stirring the mixture causing the precipitation of the molybdenum present in the mixture.

The alkaline xanthates recommended for the process according to the invention are alkaline ethylxanthates, in particular potassium ethylxanthate.

Some examples are provided for a better understanding of the present invention but should not be considered as limiting the scope of the invention itself.

EXAMPLE 1

Hydrochloric acid diluted to a pH=2 is added to an alkaline solution containing Mo and V (10 and 5 g/l respectively), followed by the slow addition of potassium ethyl xanthate in solution at 300 g/l and at room temperature, the pH=2 being maintained constant with the same acid solution.

Most of the Mo almost completely precipitates, unlike V which decreases to a much lesser extent.

The precipitation yield is about 82% for Mo and 8% for V, respectively.

EXAMPLE 2

This test is carried out analogously to the previous one but at pH≅1 by sulfuric acid. In this case, the precipitation yield of the Mo is significantly improved, with a good separation from the vanadium, 95% and 6% respectively. The molar ratio Mo:K ethylxanthate is equal to 1:6.

From chemical analysis of the washed precipitate, it can be seen that the Mo and V content is as follows:

| Element | weight % |
|---------|----------|
| V       | 0.23     |
| Mo      | 32.4     |

As can be seen, the initial Mo/V ratio, which was 2:1, becomes 140:1.

EXAMPLE 3

Diluted sulfuric acid is slowly added to an alkaline solution containing Mo at 5 g/lt and V 3 g/lt to pH≅1, followed by a solution of potassium isobutylxanthate at about 300 g/lt, the pH being maintained constant at 1. The precipitation yield of Mo in this case proved to be 93% and 7% for V.

The invention claimed is:

1. A process for selectively removing molybdenum from a liquid mixture comprising molybdenum and vanadium, wherein the concentration of the molybdenum in the liquid mixture is greater than 200 mg/l, the process comprising
bringing the liquid mixture to a pH of ≦2;
adding a solution comprising an alkaline xanthate to the liquid mixture, so that the molar ratio of the molybdenum to the alkaline xanthate ranges from ¼ to ⅛ in the liquid mixture,
maintaining constant pH of the liquid mixture by addition of an inorganic acid, as needed, to maintain constant pH, and
stirring the liquid mixture, thereby selectively precipitating and removing the molybdenum from the vanadium in the mixture.

2. The process of claim 1, wherein the molar ratio of the molybdenum to the alkaline xanthate ranges from 1/5 to 1/7.

3. The process of claim 2, wherein the alkaline xanthate is an alkaline ethylxanthate.

4. The process of claim 3, wherein the alkaline ethyl xanthate is potassium ethyl xanthate.

5. The process of claim 1, wherein the alkaline xanthate is an alkaline ethylxanthate.

6. The process of claim 5, wherein the alkaline ethyl xanthate is potassium ethylxanthate.

7. The process of claim 1, wherein the pH of the liquid mixture is 2.

8. The process of claim 1, wherein the pH of the liquid mixture is less than 2.

9. The process of claim 1, wherein the pH of the liquid mixture is 1.

10. The process of claim 1, wherein the pH of the liquid mixture is approximately 1.

* * * * *